Patented Oct. 25, 1932

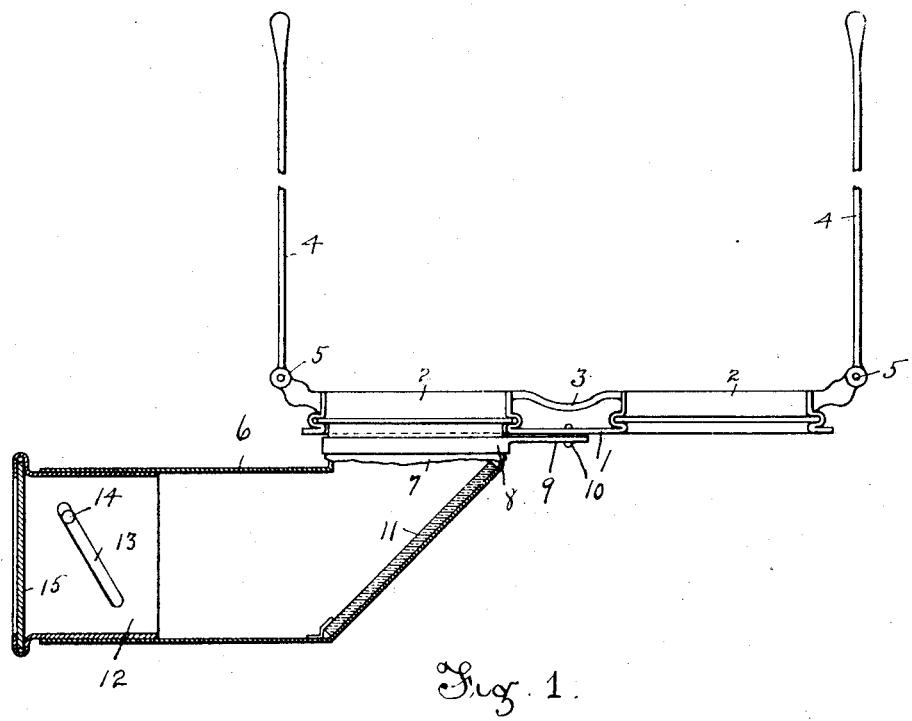
Fig. 1.
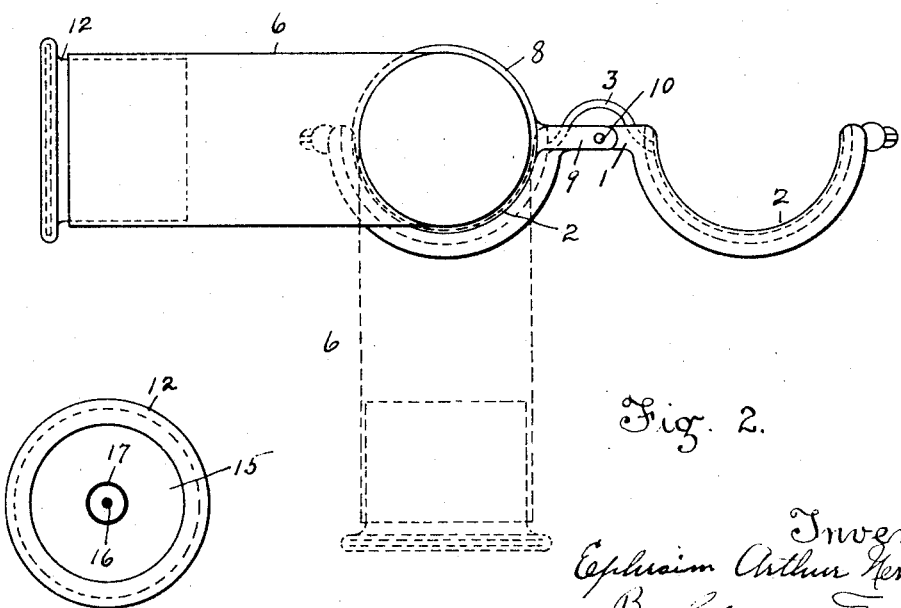
Fig. 2.
Fig. 3.
Inventor;
Ephraim Arthur Newman
By Chapin & Ferguson
Attorney.

1,884,137

UNITED STATES PATENT OFFICE

EPHRAIM ARTHUR NEWMAN, OF BALTIMORE, MARYLAND

OPTICAL INSTRUMENT

Application filed November 25, 1929. Serial No. 409,496.

This invention relates to improvements in optical instruments and has for its object to provide a device for use in examining the eye, and of such a construction and arrangement that it can be fitted upon the patient whose eyes are to be examined, and which will hold the vision, and consequently the eyes, in a fixed position so that free and ready access can be had to the eye under examination from any point in front of the eyes without in any manner interfering with, or changing, the fixed position of the vision of the eyes.

In carrying out my invention I employ a frame to fit upon the face and which is provided with a tube having a focusing lens in one end and a transparent, or opaque, disk in the other end having a dot or circle, or the other character thereon, and a mirror or other suitable reflector between the focusing lens and said disk. The said tube is adapted to be moved on said frame from one eye to the other so that when the focusing of the vision is done by one eye the other eye will co-ordinate therewith and hold the fixation of the eye being examined.

The invention consists of the novel construction and arrangement of the parts and accompanying of parts herein after more fully set forth in the following specification and pointed out in detail in the appended claims.

In the accompanying drawing:—

Figure 1 is a plan view of my invention showing the tube in section.

Figure 2 is a front view of Figure 1.

Figure 3 is an end view of the adjustable section of the tube and in which the transparent target disk is secured.

Referring to the accompanying drawing, forming part of this specification and in which like reference numerals designate like parts throughout the several views thereof, 1 designates a frame having concaved sides 2 and a bridge 3 which latter rests upon the nose. The said frame 1 is also provided with arms 4 pivoted at 5 which rests over the ears. The tube 6 has a short end 7 projecting at right angles to the body of the tube and fitting friction tight in the collar 8 which latter is provided with an arm 9 pivoted at 10 to the frame 1.

Within the collar 8 is a focusing lens (not shown) which may be of any desired strength. The tube 6 just in front of the collar 8, is formed on an angle and is provided on its inner surface with a mirror, or other suitable reflector, 11. In the outer end of the tube 6 is a short adjustable tube 12 having a slot 13 therein, into which the pin 14 projects. The said pin 14 is fixed to the inner surface of the tube 6. The said slot 13 is inclined so that when the adjustable tube 12 is turned it will be moved in or out of the tube 6 so that the focusing point can be adjusted to the proper position. The transparent, or opaque, disk 15 is secured in the outer end of the tube 12 and is provided with a dot 16 and circle 17 which serves as a target for focusing the vision. The collar 8 being pivoted to the arm 1 at 10 permits the tube to swing over from one rest 2 to the other rest 2 so that the focusing of the vision can be done with either eye, thereby affording free and unobstructed access to the eye to be examined. The tube 6 being held friction tight in the collar 8 can be turned to any desired angle as shown by dotted line in Figure 2 of the drawing.

When the frame is placed upon a patient whose eyes are to be examined the tube 6 is turned from one rest 2 to the other according to eye to be examined and as he looks through the focusing lens with one eye and fixes his vision on the target, or dot, which is reflected in the mirror 11, the other eye which works in co-ordination therewith will be held in the fixed position where it will remain so long as the vision is held on the target, or dot, in the end of the tube 6, which permits the examination of the eye from any position in front of the eyes without in any way interfering with or changing the vision.

Having thus described my invention what I claim is:

1. An optical instrument comprising a frame adapted to be fitted upon the face, a tube mounted upon said frame and adapted to be swung from one side thereof to the other, the inner end of said tube being provided with an inclined surface directly in line with the opening thereof, a reflector mounted in said tube against said inclined surface, a focusing lens in the inner end of said tube, a transparent disk in the outer end of said tube and provided with a target thereon, a pin projecting from the inner surface of said tube, and a small tube fitted within the outer end of the first named tube and having an inclined slot into which the said pin projects.

2. An optical instrument comprising a frame having two concaved sides with a bridge therebetween, arms extending from each side of the frame and adapted to fit over the ears, a collar pivoted to said frame between said concave sides and adapted to be moved from one side to the other, a tube having a short end projecting at right angles to the body thereof and having one end projecting into said collar and adapted to be revolved thereon and having an inclined inner surface in line with the opening in the end thereof, a reflector mounted against said inclined inner surface of said tube, a focusing lens in the inner end of said tube and a transparent disk in the outer end of said tube and provided with a target thereon.

In testimony whereof I affix my signature.

EPHRAIM ARTHUR NEWMAN.